July 18, 1933.  Z. J. KEGL ET AL  1,918,270
APPARATUS FOR DETERMINING CHARACTERISTICS OF A FLUID
Filed Dec. 21, 1928
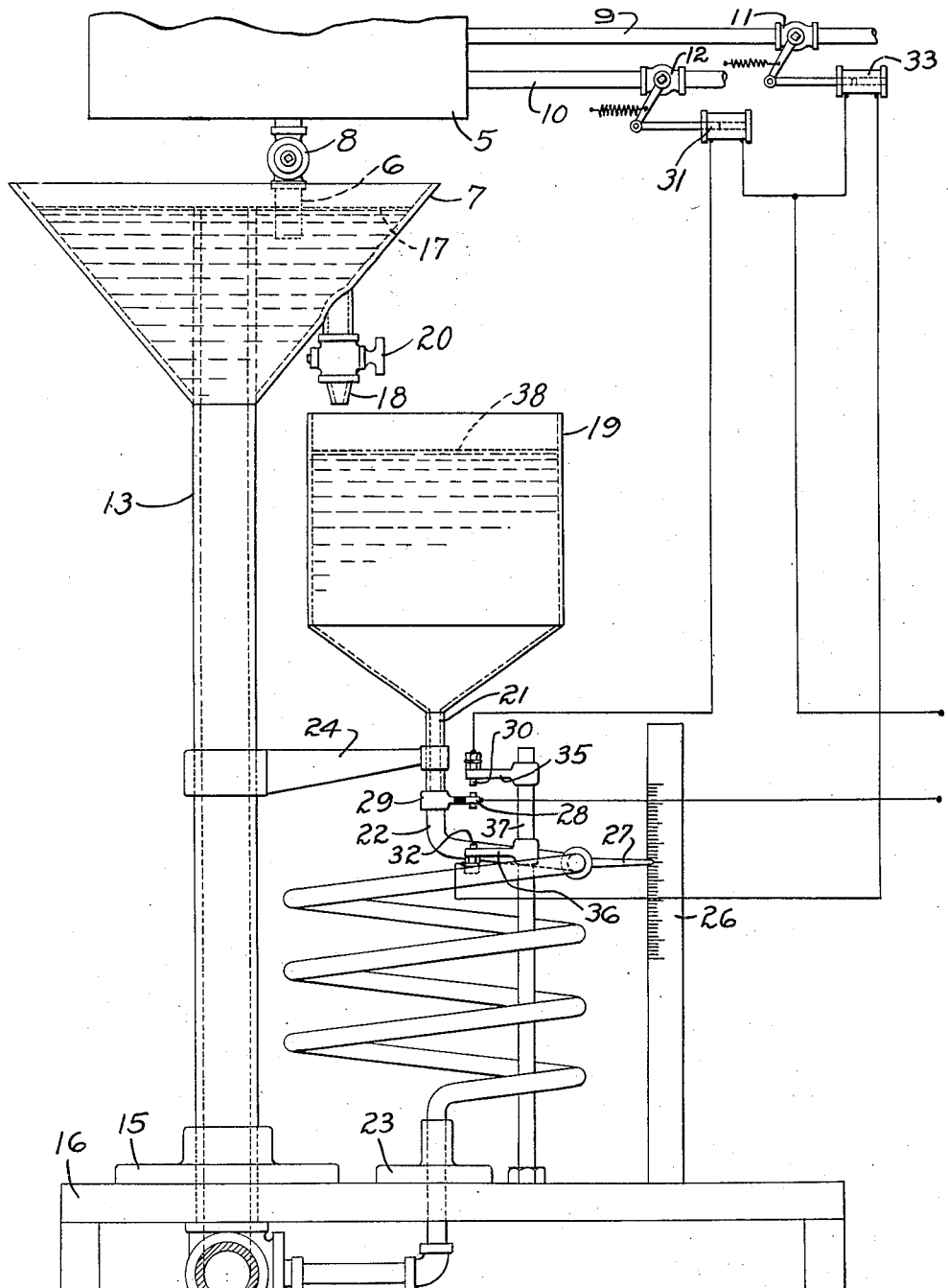
Inventors
Zoltan J. Kegl
Henry M. Larsen
by Patented July 18, 1933

1,918,270

UNITED STATES PATENT OFFICE

ZOLTAN JOSEF KEGL, OF HOLLYWOOD, CALIFORNIA, AND HENRY MARTIN LARSEN, OF LA GRANGE, ILLINOIS, ASSIGNORS TO WESTERN ELECTRIC COMPANY, INCORPORATED, OF NEW YORK, N. Y., A CORPORATION OF NEW YORK

APPARATUS FOR DETERMINING CHARACTERISTICS OF A FLUID

Application filed December 21, 1928. Serial No. 327,578.

This invention relates to apparatus for determining characteristics of a fluid, and more particularly to apparatus for indicating the viscosity and specific gravity of a fluid.

In dealing with certain fluids it is essential that certain predetermined characteristics be maintained in order to obtain the desired results. Thus, for example, in dealing with wire enamel compounds it has been found that certain combinations of viscosity and specific gravity characteristics are essential to the attainment of satisfactory results. It has heretofore been the practice in some instances to employ separate means for determining and controlling each individual characteristic of the fluid, which practice is obviously slow and necessitates the use of expensive testing and controlling equipment.

The object of this invention is to provide an inexpensive and efficient apparatus for indicating characteristics of a fluid.

The invention contemplates the provision of means for providing a constant static head of the fluid from which the fluid is supplied through an orifice of predetermined size to a container supported by a spiral spring tube through which the fluid is discharged. The arrangement is such that variations in viscosity and specific gravity result in predetermined deflections of the spring tube whereby such variations may be indicated on a calibrated scale by means of a pointer attached to the tube. Contacts controlled by the tube deflections may serve to close controlling circuits which include valves for admitting thinners or fillers to the fluid to maintain the desired characteristics.

It is believed that a clear understanding of the invention will be had from the following detailed description of one specific embodiment thereof, reference being had to the accompanying drawing which illustrates, somewhat diagrammatically, an apparatus embodying the features of the invention.

The invention is herein illustrated and described in connection with an apparatus for determining and controlling the viscosity and specific gravity of wire enamel compounds. It should be understood, however, that the novel features of the invention are capable of numerous other applications within the scope of the appended claims.

Referring now to the drawing, it will be observed that a tank 5 containing a supply of the compound is provided with an outlet pipe 6 through which the compound discharges into a funnel shaped receptacle 7 under the control of a suitable valve 8. Pipes 9 and 10 are connected to the tank 5 for supplying thinners and fillers to the compound under the control of valves 11 and 12 whereby the desired characteristics of the compound are maintained. A vertically disposed pipe 13 is connected at its upper end with the receptacle 7 and communicates at its lower end with a horizontally disposed return pipe 14 which may be connected to the supply tank 5 in any suitable manner (not shown). The pipe 13 is supported by means of a flanged collar 15 secured to a suitable supporting frame 16. The upper portion of the pipe 13 extends into the receptacle 7 so as to provide an overflow outlet by which the compound in the receptacle is maintained at a constant level as indicated by the numeral 17. By this arrangement it will be understood that a constant static head of the compound is maintained within the receptacle 7.

The receptacle 7 is provided with an adjustable outlet in the form of a nozzle 18 through which the compound flows into a container 19 under the control of an adjustable valve 20. The lower portion of the container 19 tapers downwardly to a reduced portion 21 which serves as a restricted outlet for the compound. The container 19 is supported upon a spiral spring tube 22 which is connected at one end to the reduced portion 21 and communicates at its opposite end with the return pipe 14. The spiral tube 22 is secured at its lower end to the frame 16 by means of a flanged collar 23.

The container 19 is vertically movable in a bracket 24 secured to the pipe 13. Due to the resiliency of the spiral tube 22 it will be obvious that the container 19 is movable by the force of gravity into a plurality of positions in accordance with variations in the specific gravity and quantity of the compound contained therein. It will also be understood that the spiral tube 22 is deflected in accordance with the movement of the container 19 whereby the extent of movement of the container may be indicated upon a calibrated scale 26 by a cooperating pointer 27 secured to the upper portion of the spiral tube 22.

An electrical contact member 28 carried by an arm 29 secured to the upper end of the spiral tube 22 is arranged to engage a cooperating contact member 30 upon a predetermined upward movement of the container 19, thus establishing an electrical circuit through the winding of a solenoid 31. The completion of the circuit just described causes the energization of the solenoid 31 whereby it operates in a well known manner to open the valve 12 for supplying a filler to the compound. Upon a predetermined downward movement of the container 19 the contact 28 engages a cooperating contact 32, thus establishing an electrical circuit through the winding of a solenoid 33 which operates the valve 11 for controlling the supply of a thinner to the compound. The contacts 30 and 32 are secured to and insulated from arms 35 and 36, respectively, which may be adjustably attached to a vertically disposed bar 37 secured to the supporting frame 16.

In the operation of the above described apparatus the valve 8 is manually adjusted so as to maintain a constant static head of the compound in the receptacle 7. The valve 20 is also manually adjusted so that under normal conditions the compound in the container 19 is maintained at a constant level indicated by the dotted line 38. The apparatus is so constructed that when the compound is of the desired viscosity and specific gravity, the contact 28 will assume a position substantially midway between the contacts 30 and 32. As the specific gravity of the compound increases the container 19 moves downwardly due to the force of gravity. This downward movement of the container causes a deflection of the spiral tube 22 and the extent of the deflection and therefore the extent of the specific gravity variation is indicated upon the calibrated scale 26 by the pointer 27. Upon the specific gravity of the compound increasing above a certain predetermined value the contact 28 engages the contact 32, thereby establishing an electrical circuit through the winding of the solenoid 33 which operates the valve 11 to admit a thinner to the compound to decrease its specific gravity. As the specific gravity of the compound decreases the container 19 moves upwardly, due to the resiliency of the spiral tube 22, which movement of the container is indicated upon the calibrated scale 26 by the pointer 27. Upon the specific gravity of the compound decreasing below a certain predetermined value the contact 28 engages the contact 30, thereby establishing an electrical circuit through the winding of the solenoid 31 which operates the valve 12 for admitting a filler to the compound to increase its specific gravity.

It will be understood that the viscosity of the compound determines its rate of flow from the container 19 through the spiral tube 22. The supply nozzle 18 and the outlet tube 22 are so designed that upon the viscosity of the compound increasing, its rate of flow through the spiral tube 22 decreases below its rate of flow through the supply nozzle 18. This causes an increase in the quantity of the compound retained in the container 19 which results in a downward movement of the container due to the force of gravity. Upon a continued downward movement of the container 19, the contact 28 engages the contact 32, thereby establishing an electrical circuit through the winding of the solenoid 33 which thereupon operates the valve 11 to admit a thinner to the compound to decrease its viscosity. In a similar manner, as the viscosity of the compound decreases its rate of flow through the spiral tube 22 increases above its rate of flow through the supply nozzle 18. This causes a decrease in the quantity of the compound retained in the container 19 whereupon the container moves upwardly due to the resiliency of the tube 22. Upon a continued upward movement of the container, the contact 28 engages the contact 30, thereby establishing an electrical circuit through the winding of the solenoid 31 which thereupon operates to admit a filler to the compound to increase its viscosity. With the liquids in connection with which this indicating apparatus is used the viscosity and specific gravity both vary in the same sense; that is, either increase or decrease in value, and thus it is apparent that the apparatus responds to the combined effect of the variation of both the viscosity and specific gravity. Thus it will be obvious that the improved apparatus provides a simple and economical means for indicating various characteristics of compounds or fluids.

It is to be understood that the invention is not limited to the specific embodiment herein illustrated and described, but is capable of numerous other applications within the scope of the appended claims.

What is claimed is:

1. In an apparatus for determining a characteristic of a fluid, a container for holding a supply of the fluid, means for supplying the fluid to the container at a substantially constant rate, a spiral spring tube for providing an outlet for the fluid in the container to impede the flow of the fluid therefrom and for yieldingly supporting the container in a position determined by the amount of fluid in the container, and means responsive to the movement of the container for indicating variations in the amount of fluid in the container thereby to indicate a characteristic of the fluid.

2. In an apparatus for determining the viscosity of a fluid, a container for holding a supply of fluid, means for supplying the fluid to the container at a substantially constant rate, and means for conducting the fluid from the container at a rate equal to the rate at which the fluid is supplied thereto when the viscosity of the fluid is within predetermined limits, said last mentioned means comprising a resilient spiral outlet tube having an elongated passage therethrough for supporting the container in a predetermined position when the amount of fluid therein is within predetermined limits.

3. In an apparatus for determining the viscosity of a fluid, a container for holding a supply of fluid, means for supplying the fluid to the container at a substantially constant rate, means for conducting the fluid from the container at a rate substantially equal to the rate at which the fluid is supplied thereto when the viscosity of the fluid is within predetermined limits, said last mentioned means comprising a resilient spiral tube having an elongated passage therethrough for supporting the container in a predetermined position when the amount of fluid therein is within predetermined limits, and means secured to the container for indicating its position thereby to indicate the viscosity of the fluid passing through the container.

4. In an apparatus for determining the viscosity of a fluid, a fluid container, a helical tube connected to the container for resiliently supporting the container and restricting the flow of fluid therefrom in accordance with its viscosity, means for supplying fluid to the container at a predetermined rate, and an indicating device responsive to the height of fluid in the container for indicating the viscosity of the fluid.

5. An apparatus for determining the viscosity of a fluid comprising a container, a resilient spiral tube forming an outlet and positioning means for the container, means for supplying a fluid to the container at a constant rate, and means for indicating viscosity of the fluid in response to the position of the container.

ZOLTAN JOSEF KEGL.
HENRY MARTIN LARSEN.